(12) United States Patent
Sobel et al.

(10) Patent No.: US 9,477,348 B2
(45) Date of Patent: Oct. 25, 2016

(54) FOCUS-BASED TOUCH AND HOVER DETECTION

(75) Inventors: Irwin E. Sobel, Menlo Park, CA (US); Kar-Han Tan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1182 days.

(21) Appl. No.: 13/088,152

(22) Filed: Apr. 15, 2011

(65) Prior Publication Data
US 2012/0262420 A1 Oct. 18, 2012

(51) Int. Cl.
*G06F 3/02* (2006.01)
*G06F 3/042* (2006.01)

(52) U.S. Cl.
CPC .................................. *G06F 3/0425* (2013.01)

(58) Field of Classification Search
None
See application file for complete search history.

(56) References Cited

U.S. PATENT DOCUMENTS

| 7,372,451 B2 | 5/2008 | Dempski |
| 7,466,308 B2 * | 12/2008 | Dehlin .......................... 345/175 |
| 2008/0284925 A1 | 11/2008 | Han |
| 2009/0298537 A1 | 12/2009 | Choi |
| 2010/0053081 A1 | 3/2010 | Jee et al. |
| 2010/0062803 A1 | 3/2010 | Yun et al. |
| 2010/0103103 A1 * | 4/2010 | Palanker et al. .............. 345/158 |
| 2010/0222110 A1 | 9/2010 | Kim et al. |
| 2011/0291988 A1 * | 12/2011 | Bamji et al. .................. 345/175 |
| 2011/0316679 A1 * | 12/2011 | Pihlaja ......................... 340/407.2 |
| 2012/0113062 A1 * | 5/2012 | Briden et al. ................. 345/175 |
| 2012/0127084 A1 * | 5/2012 | Large et al. .................. 345/173 |

* cited by examiner

*Primary Examiner* — William Boddie
*Assistant Examiner* — Bryan Earles
(74) *Attorney, Agent, or Firm* — HP Inc. Patent Department (57) ABSTRACT

Embodiments of the present invention disclose a system and method for focus-based touch detection. According to one embodiment, a reference pattern is formed on a surface and an imaging device is configured to detect the reference pattern and the presence of an object within proximity of a contact area of the surface. Furthermore, focus information associated with the reference pattern and/or object is used to determine if the detected object is touching or hovering said contact area.

11 Claims, 8 Drawing Sheets

FOCUS-BASED TOUCH AND HOVER DETECTION

BACKGROUND

Providing efficient and intuitive interaction between a computer system and users thereof is essential for delivering an engaging and enjoyable user-experience. Today, most computer systems include a keyboard for allowing a user to manually input information into the computer system, and a mouse for selecting or highlighting items shown on an associated display unit. As computer systems have grown in popularity, however, alternate input and interaction systems have been developed.

For example, touch-sensitive, or touchscreen computer systems allow a user to physically touch the display unit and have that touch registered as an input at the particular touch location, thereby enabling a user to interact physically with objects shown on the display. In addition, hover-sensitive computing systems are configured to allow input from a user's fingers or other body part when positioned in close proximity to—but not physically touching—the display surface.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 3A is a three-dimensional illustration of the detection system including focal sub-regions associated with a touch condition, while

FIG. 4A is a three-dimensional illustration of the detection system including focal sub-regions associated with a hover condition, while

FIG. 5A is a three-dimensional illustration of the detection system including focal sub-regions associated with another hover condition, while

FIG. 6A is a three-dimensional illustration of the detection system including focal sub-regions associated with another hover condition, while

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

There are several types of touchscreen technologies and associated display panels in existence today. For example, a resistive touchscreen panel includes a multitude of layers, and most importantly, two thin electrically conductive layers separated by a narrow gap. When an object, such as a user's finger or stylus, comes into contact with a point on the panel's outer surface, the two conductive layers become connected and the processor registers that point as a desired touch point. Moreover, a surface acoustic wave (SAW) touchscreen panel uses ultrasonic waves that pass over the touchscreen panel so that when the panel is touched, a portion of the wave is absorbed thus causing the processor to register the change in the ultrasonic waves as a known touch event.

Still further, multi-touch technologies such as Frustrated Total Internal Reflection (FTIR) uses infrared or three-dimensional optical sensors for detecting touch events. More particularly, when a user comes into contact with the surface, the light rays projected from the optical sensors are able to pass through into the contact material (e.g., user's finger), and the reflection is no longer total at that point (i.e., "light is frustrated"). As a result, the projected light rays are now able to exit the front surface of the display at the particularly contact point, becoming clearly visible to the camera for location determination. However, each of these touchscreen technologies require complex and often expensive components and also have difficulty distinguishing between a user's body part (e.g., finger) hovering over the display screen versus actually touching the screen.

Embodiments of the present invention provide a system and method for focus-based touch detection. According to one example, the system includes a computing system having a display unit and an imaging device positioned at a rear side thereof. Furthermore, a reference pattern is embedded along a border area of the front surface of the display unit. Based on the focus information of the reference pattern and/or a detected object, a touch event and hover event may be accurately distinguished from one another.

Figure 1A:
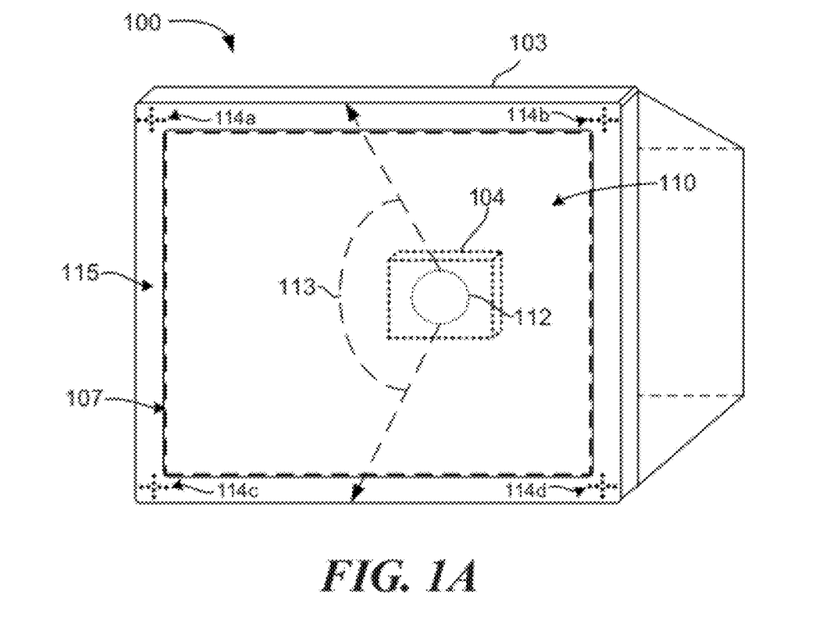
FIGS. 1A and 1B are three-dimensional and top-down views respectively of the focus-based detection system according to an example of the present invention.
Figure 1B:
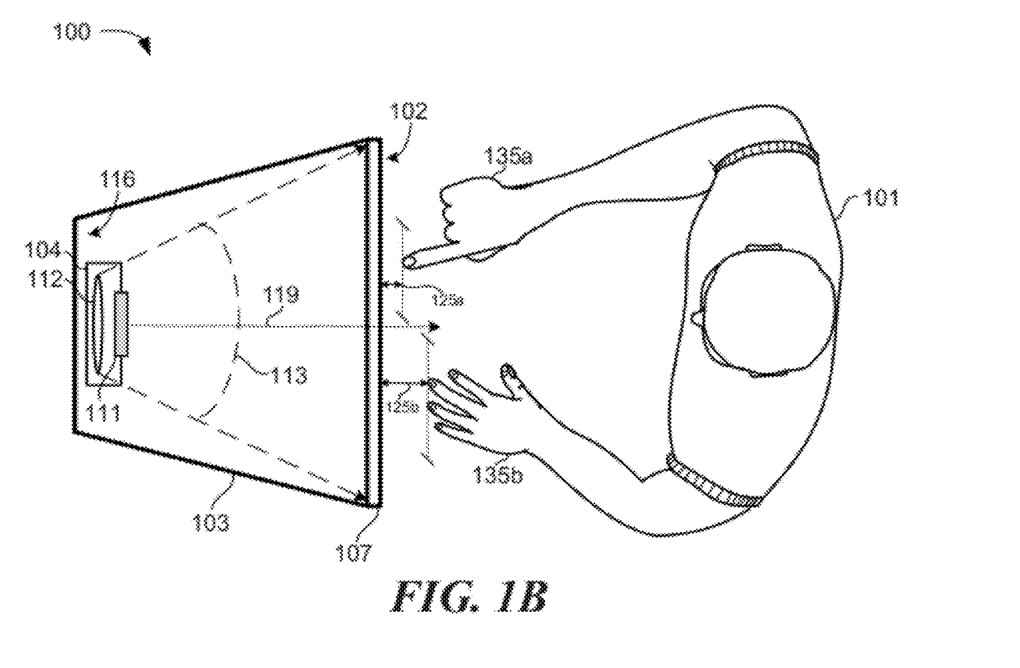

Referring now in more detail to the drawings in which like numerals identify corresponding parts throughout the views, FIGS. 1A and 1B are three-dimensional and top down views respectively, of the focus-based detection system according to an example of the present invention. As shown in FIG. 1A, a computing device 100 includes a housing 103 for accommodating a display unit 107 and a camera assembly 104. According to one example, a camera assembly 104 is formed on a rear side of the display unit 107 and includes an imaging device or camera 112. The camera 112 may have a non-adjustable focus, or fixed-focus lens in which case the focus remains fixed at a set hyperfocal distance. According to one example embodiment, the hyperfocal distance is set such that the depth of field 119 (shown in FIG. 1B), or distance to which objects have sufficient sharpness, includes an area immediately near the front surface 102 of the display unit 107. Alternatively, the camera 112 may include an autofocus mechanism having an autofocus area 110, which is a circumscribed region of the camera's 112 field of the field-of-view (FOV) 113. As shown here, the autofocus area 110 should substantially encompass the entire display surface of the display unit 107 in order to provide focus-depth adjustment on any particular region in which the user desires to interact with (single or multi-touch). However, the field-of-view 113 of the imaging device 112 includes the autofocus area in addition to a display border area 115 of the computing device 100. More particularly, the display border area 115 may be formed as part of the display unit 107 and includes a plurality of reference patterns 114a-114d embedded thereon. According to one example embodiment, the reference patterns 114a-114d are formed along the border area 115 of the display unit such that the area coplanar and within the border area 115 is designated as the contact area (i.e., front surface) for receiving/detecting input from an operating user. The reference patterns 114a-114d are faint and visually unobtrusive, and positioned just outside of the autofocus area 110 as shown in FIG. 1A. When utilizing a fixed-focus lens, the reference patterns 114a-114d are always kept in focus by the imaging device 112. As will be explained in more detail with reference to later figures, a processing unit utilizes the camera images to assess the frequency (e.g., edge contrast or sharpness) of at least one reference pattern 114a-114d or detected object 135a-135b for determining an appropriate touch or hover event.

FIG. 1B is a top-down perspective view of the focus-based detection system in accordance with an example of the present invention. As shown here, the display assembly 107 includes a front surface layer 103 formed on a front side 115 and having a reference pattern 114 embedded therein. According to one embodiment, each of the user's body part(s) 135a and 135b are dynamically kept in focus by the auto focus mechanism 111 of the imaging device 112. Furthermore, a display device 106 is formed on a transparent substrate 109 on a side of the front surface layer 103 opposite the side facing the user 101. According to one example of the present invention, a camera assembly 104 is positioned on a rear side 116 of the display unit 107 so as to provide a field of view 113 that encompasses the entire display surface (i.e, surface area within display border area 115) along with the display border area 115 of the display unit. More particularly, the camera assembly 104 includes an imaging device 112 having a respective field of view 113 for capturing images of the user and any associated body-part motions along the front surface 102 of the display unit 107.

The camera assembly 104 may also include an autofocus mechanism 111 enabled with a focus-control means for adjusting the camera's focus-depth. For example, edge sharpness and/or contrast of a determined auto-focus region may be maximized by dynamically adjusting the focus-depth of the autofocus mechanism 111. Still further, the auto-focus region may be dynamically determined through operation of the processing unit searching through various focus-depths and processing images from near (i.e., screen depth) to far so as to find the closest in-focus body-part (i.e., having sufficiently sharp-edges). In the present example, the processing unit may detect multiple focus depths 125a and 125b and process the image relating to the user's right hand 135a prior to processing the image associating with the user's left hand 135b since right hand focus-depth 125a is closer to the screen-depth (i.e., display contact surface) than the left hand 135b.

Figure 2:
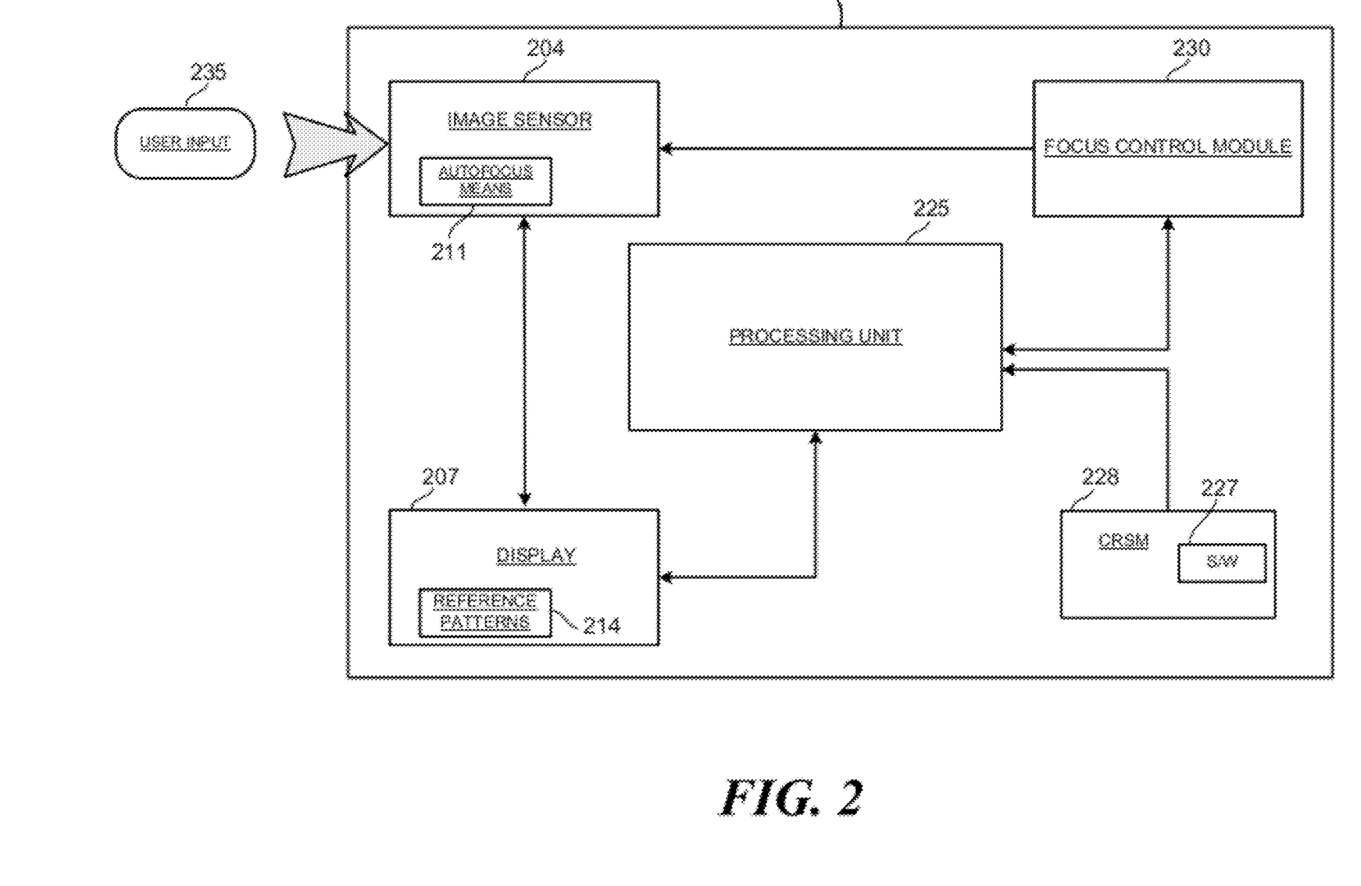
FIG. 2 is a simplified system diagram of the focus-based touch detection system according to an example of the present invention.

FIG. 2 is a simplified system diagram of the focus-based touch detection system according to an example of the present invention. FIG. 2 is a simplified block diagram of the system implementing the magnified control area for facilitating user input according to an example of the present invention. As shown in this exemplary embodiment, the system 200 includes a processor 225 coupled to a display 207, an image sensor 204, a focus control module 230, and computer-readable storage medium 228. In one embodiment, processor 225 represents a central processing unit (CPU), microcontroller, microprocessor, or logic configured to execute programming instructions on the associated focus-based computing system 200. Image sensor 204 may be a basic image capturing device having a fixed-focus lens or an autofocus means 214 for capturing and adjustably focusing on an object (e.g., user input 235) positioned in front of the display 207. Display 207 represents a surface having an inconspicuous reference pattern embedded along a border area thereof. For example, display 207 may represent an transparent display configured to display images to an operating user, a glass or tabletop surface, or a frame having an internal contact area that may be automatically or manually assigned by the processing unit or operating user. Similarly, the border of the display or surface 207 may comprise of any shape (e.g., rectangular, square, circular, etc.) while the designated contact area of the display 207 may be flat, concave, or convex for example. Furthermore, the focus control module 230 is configured to receive image data from the image sensor 204 and adjust to or determine an appropriate degree of focus or focus-depth for the autofocus mechanism. Storage medium 228 represents volatile storage (e.g. random access memory), non-volatile store (e.g. hard disk drive, read-only memory, compact disc read only memory, flash storage, etc.), or combinations thereof. Furthermore, storage medium 228 includes software 227 that is executable by processor 225 and, that when executed, causes the processor 220 to perform some or all of the functionality described herein. For example, the focus control module 230 may be implemented as executable software within the storage medium 228.

Figure 3A:
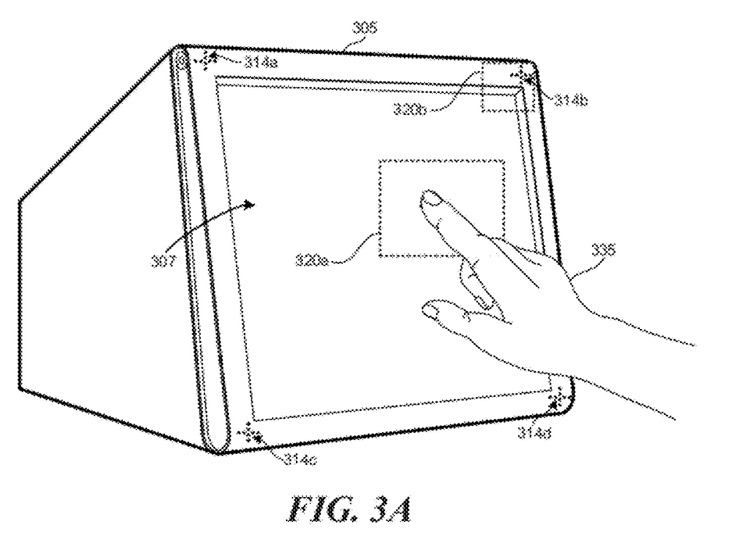
Figure 3B:
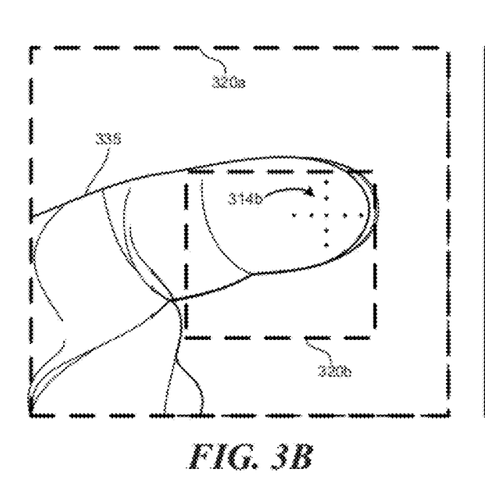
FIG. 3B is a montage view superimposing the focal sub-regions of FIG. 3A.
Figure 3C:
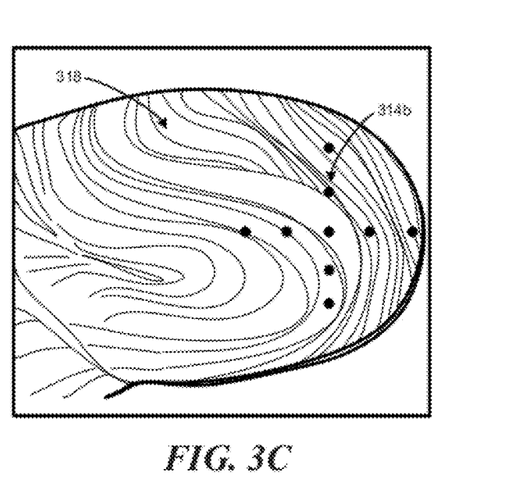
FIG. 3C is an enlarged view of the montage shown in FIG. 3B in accordance with an example of the present invention.

FIG. 3A is a three-dimensional illustration of the detection system including focal sub-regions associated with a touch condition, while FIG. 33 is a montage view superimposing the focal sub-regions of FIG. 3A, and FIG. 3C is an enlarged view of the montage shown in FIG. 3B in accordance with an example of the present invention. As shown in FIG. 3A, a user's body part 335 is positioned along the front surface of the display unit 307. As a result, the camera assembly detects and captures focal sub-regions within the imaging device's field-of-view that are associated with both the user's body part (e.g., finger) and at least one reference pattern, which may be the reference pattern closest to the focal sub-region of the detected body part (though any reference pattern or multiple reference patterns may be chosen). As shown in the present example, focal sub-regions 320a and 320b of the camera's field of view are represented as dotted lines and include the detected body part 335 and reference pattern 314b. As mentioned above, the reference pattern 314 should be non-visually intrusive and have significant edge content that may be focused on by the image sensor via a fixed-focus lens or an autofocus mechanism. FIG. 3B is a montage view superimposing the focal sub-regions depicted in FIG. 3A. As explained above, within a fixed-focus environment the reference patterns 314a-314d are always kept in focus so as to provide high-frequency edge content of each reference pattern. In such an environment, the edge content of the detected object or body part is then analyzed. Alternatively, an autofocus mechanism of the imaging device may dynamically adjust the focus-depth of the imaging device to focus on the user's body part. If the reference pattern and detected body part are simultaneously in focus (fixed-focus lens) or if the focus-depth of the detected body part and reference pattern are simultaneously at a maximum (auto-focus mechanism), then the processing unit may determine that the detected body part is in sufficiently close physical contact with the front surface of the display unit. As shown in FIG. 3O, both the reference pattern 314b and the ridges 318 of the user's fingertips are well-defined and plainly visible thus indicating that the body part is in focus and that the focus-depth of reference pattern and detected body part are substantially equal. Such information can be used as a "touch" or physical contact criterion by the processing unit in determining that a "touch condition" has occurred within the focal sub-region 320a.

Figure 4A:
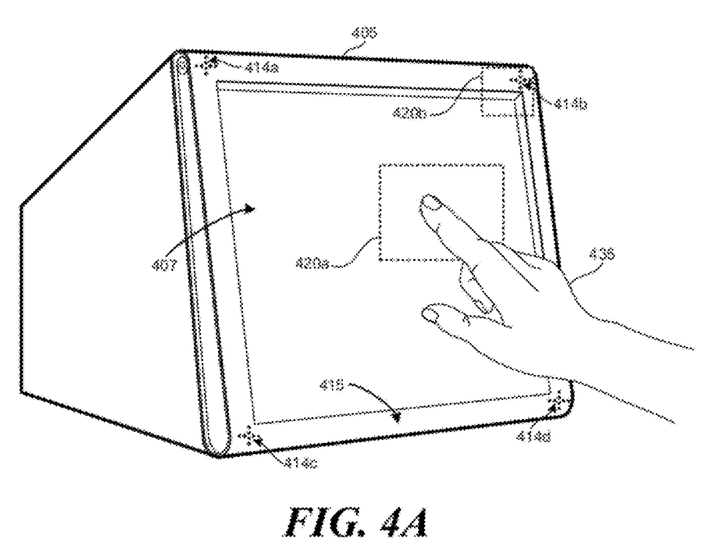
Figure 4B:
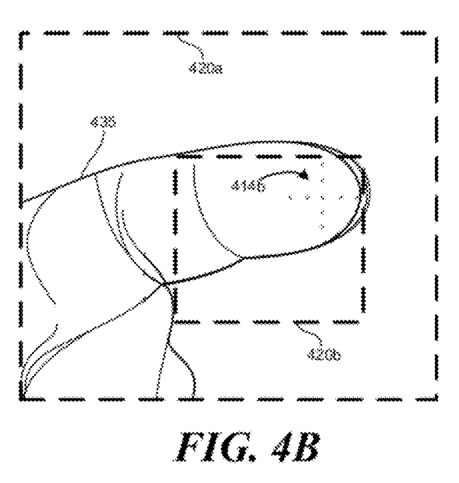
FIG. 4B is a montage view superimposing the focal sub-regions of FIG. 4A.
Figure 4C:
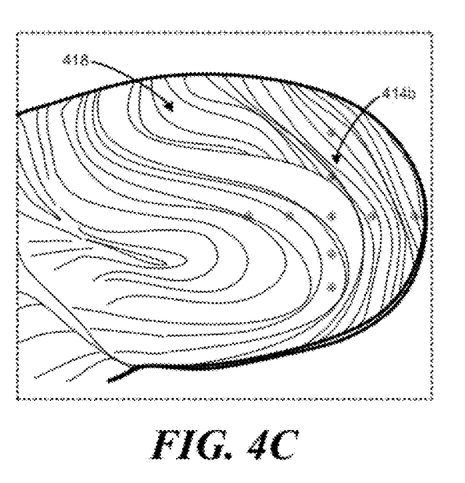
FIG. 4C is an enlarged view of the montage shown in FIG. 4B in accordance with an example of the present invention.

FIG. 4A is a three-dimensional illustration of the detection system including focal sub-regions associated with a hover condition, while FIG. 4B is a montage view superimposing the focal sub-regions of FIG. 4A, and FIG. 4C is an enlarged view of the montage shown in FIG. 4B in accordance with an example of the present invention. As shown in FIG. 4A, a user's body part 435 is positioned along the front surface of the display unit 407. As seen from the field of view of the imaging-device, images of focal sub-regions 420a and 420b associated with both the user's body part (e.g., finger) and at least one reference pattern 414b respectively, are captured by the image sensor. As mentioned above, reference patterns 414a-414d may be represented as four small crosshairs positioned along a border area 415 of the display unit 407. FIG. 4B is a montage view superimposing the focal sub-regions depicted in FIG. 4A. More particularly, the present example illustrates a view that overlays the focal sub-region 420b of the reference pattern 414b over the sub-region 420a of the user's finger 435 (as seen from the field of view of the image sensor). The autofocus mechanism dynamically adjusts the focus-depth of the imaging device to focus on the user's body part 435. The resulting focus-depth of the object 435 and reference pattern 414b are then analyzed by the processing unit. In the present example, the ridges 418 of the user's finger 435 are well-defined and plainly visible due to the autofocus adjustment by the autofocus mechanism, while the reference pattern 414b is faint and slightly discernable thus indicating that the object (i.e., user finger) is not at the same focus-depth as the reference pattern (i.e., not at screen-depth). However, since the reference pattern 414b of FIG. 4C is slightly in focus, the processing unit may determine that the detected object 435 is in close proximity, though not touching, to the display surface. Such information may be used by the processing unit as criterion for determining that a "slight hover event" has occurred within the focal sub-region 420a.

Figure 5A:
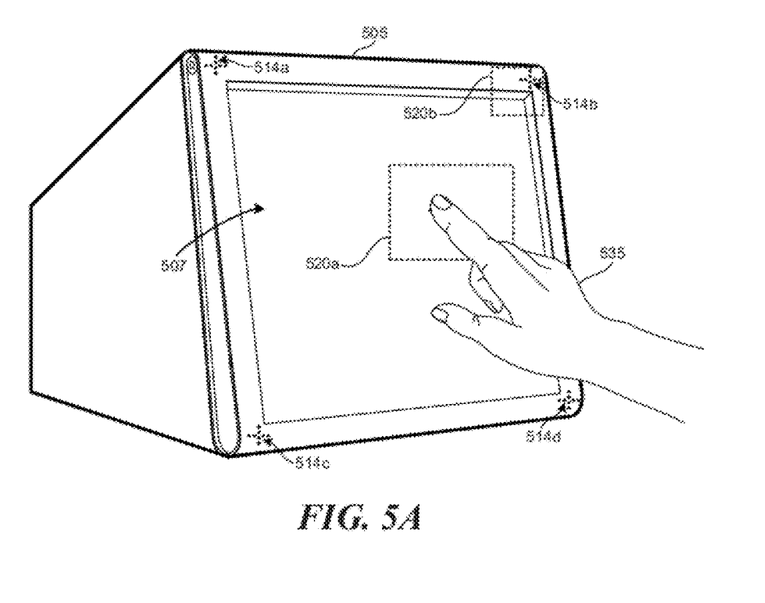
Figure 5B:
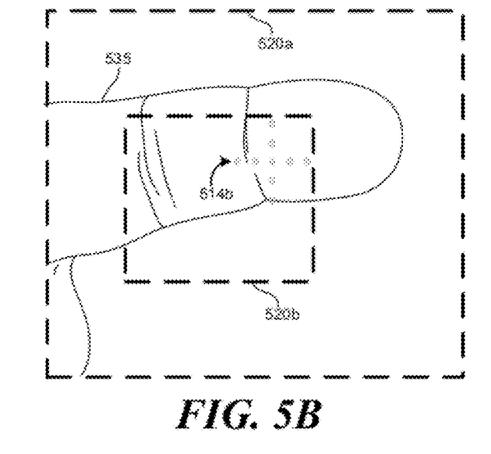
FIG. 5B is a montage view superimposing the focal sub-regions of FIG. 5A.
Figure 5C:
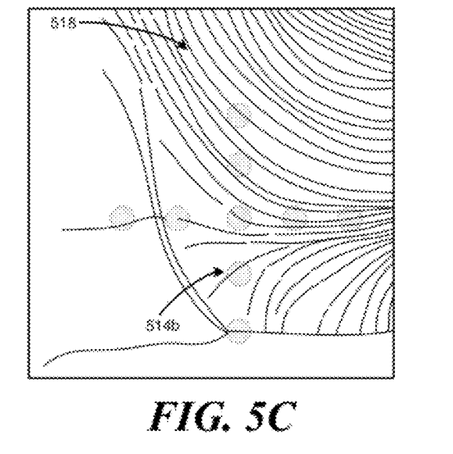
FIG. 5C is an enlarged view of the montage shown in FIG. 5B in accordance with an example of the present invention.

FIG. 5A is a three-dimensional illustration of the detection system including focal sub-regions associated with another hover condition, while FIG. 5B is a montage view superimposing the focal sub-regions of FIG. 5A, and FIG. 5C is an enlarged view of the montage shown in FIG. 53 in accordance with an example of the present invention. As shown in FIG. 5A, a user's body part 535 is positioned along the front surface of the display unit 507. In accordance with one example, upon detecting the presence of an object, the imaging device captures images of focal sub-regions 520a and 520b, which are respectively associated with an object or body-part 535 (e.g., user's finger) and at least one reference pattern 514b of the plurality of reference patterns 514a-514d. FIG. 5B is a montage view superimposing the focal sub-regions depicted in FIG. 5A. More particularly, the present example illustrates a view that overlays the focal sub-region 520b of the reference pattern 514b over the focal sub-region 520a of the detected object 535. In the present example, the ridges 518 of the user's finger 535 are well-defined and plainly visible (i.e., sharp, high contrast) due to the autofocus adjustment by the autofocus mechanism, while the edge content and sharpness of the reference pattern 514b is barely discernable thus indicating that the object (e.g., user finger) is not at the same focus-depth as the reference pattern (i.e., not at screen-depth). Since the focus-depth of the reference pattern 514b is FIG. 5C is remarkably low, the processing unit may determine that the detected object 535 is not within an immediate touching distance of the display surface. Such information can be used as criterion by the processing unit in determining that a "hover event" has occurred at the detected location.

Figure 6A:
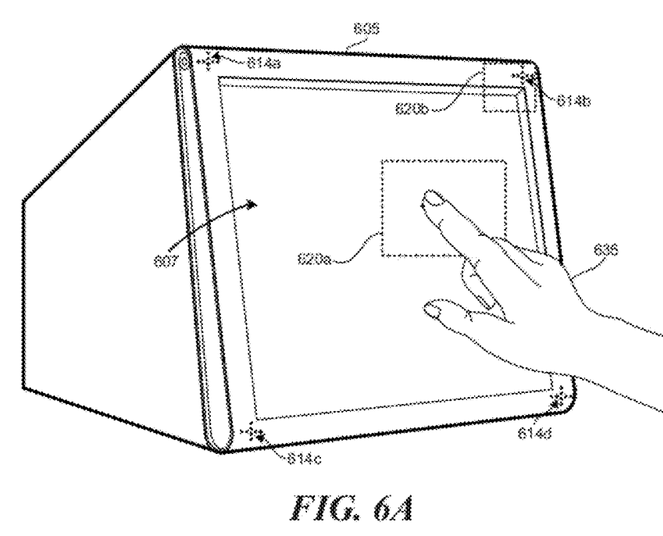
Figure 6B:
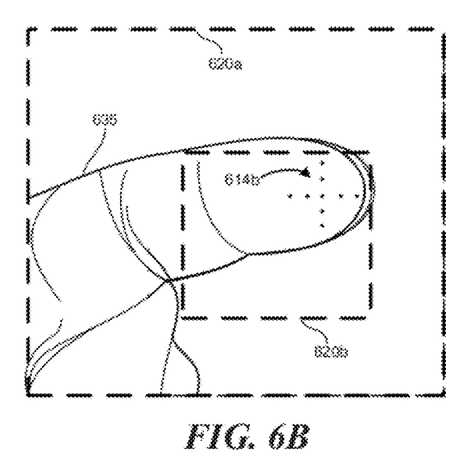
FIG. 6B is a montage view superimposing the focal sub-regions of FIG. 6A.
Figure 6C:
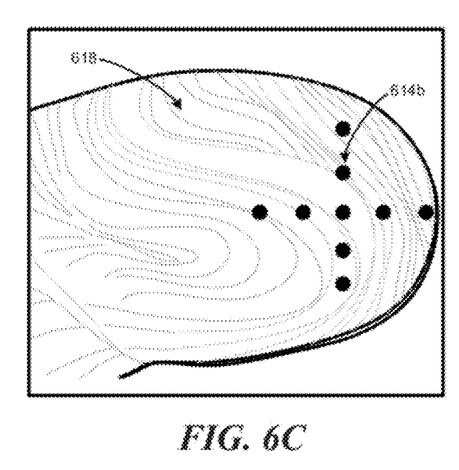
FIG. 6C is an enlarged view of the montage shown in FIG. 6B in accordance with an example of the present invention.

FIG. 6A is a three-dimensional illustration of a fixed-focus detection system including focal sub-regions associated with another hover condition, while FIG. 6B is a montage view superimposing the focal sub-regions of FIG. 6A, and FIG. 6C is an enlarged view of the montage shown in FIG. 6B in accordance with an example of the present invention. As shown in FIG. 6A, a user's body part 635 is positioned along the front surface of the display unit 607. In accordance with one example, upon detecting the presence of an object, the imaging device captures images of focal sub-regions 620a and 620b, which are respectively associated with an object or body-part 635 (e.g., user's finger) and at least one reference pattern 614b of the plurality of reference patterns 614a-614d. FIG. 6B is a montage view superimposing the focal sub-regions depicted in FIG. 6A. More particularly, the present example illustrates a view that overlays the focal sub-region 620b of the reference pattern 614b over the focal sub-region 620a of the detected object 635. The processing unit may then determine the edge content or sharpness of the detected object or body part 635. In the present example, the feature pattern 614b is kept in focus via the fixed-focus lens of the imaging device, while the ridges 618 of the user's fingertip 635 are vague and difficult to discern (i.e., out of focus). In this fixed-focused detection environment, such information can be used as criterion by the processing unit in determining that a "hover event" has occurred at the detected location since the object 635 is outside the depth of field of the imaging device.

Figure 7:
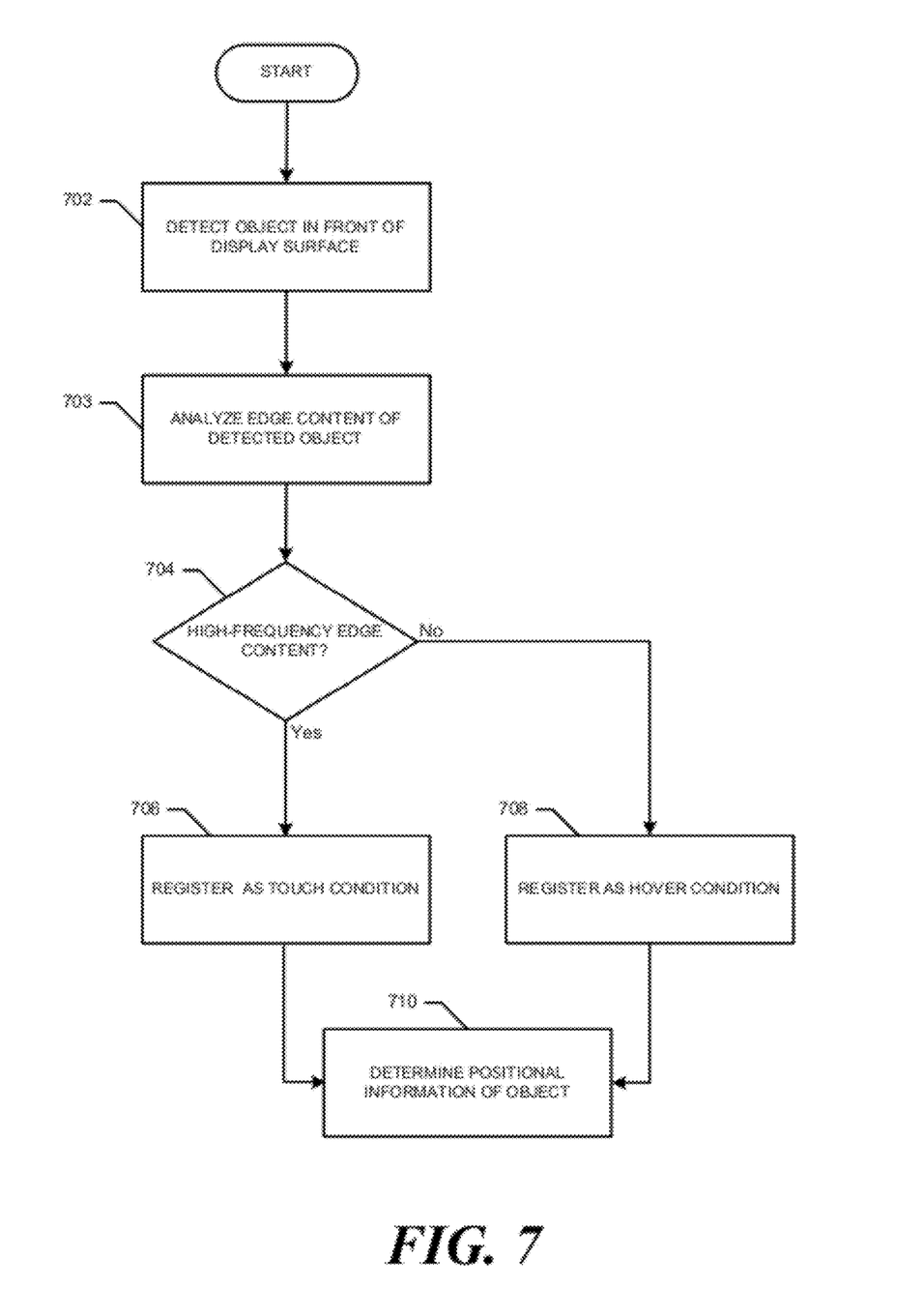
FIG. 7 is a simplified flow chart of the processing steps for focus-based touch detection using a fixed-focus lens according to an example of the present invention.

FIG. 7 is a simplified flow chart of the processing steps for focus-based touch detection using a fixed-focus lens according to an example of the present invention. In step 702, the image sensor continuously monitors its field of view until it detects the presence of an object or user's body part along the front of the display surface. In one example, the processing unit may analyze if the edge content of the detected object is greater than a minimum focus value (e.g., capable of discernment or edge tracking for positional determination) in step 703. Next, in step 704, the processing unit determines if the object is near a maximum focus value or has sufficiently high-frequency edge content (i.e., in focus) simultaneously with the high-frequency content of the reference pattern. If so, then the processing unit registers and associates a "touch condition" with the detected object in step 706. On the hand, if the edge content of the detected object is significantly lower than the maximum focus value, then the processing unit registers and associates a "hover condition" with the detected object. In either case, the processing unit is then configured to determine positional or location information of the detected object. In one example, the processing unit may convert the image (or images in the case of multi-touch) to an edge cluster(s) and compute a centroid location of the cluster(s). The determined (x, y) coordinates of each centroid location may be used to determine the contact or hover point with respect to the display surface. However, examples of the present invention are not limited thereto and any object tracking algorithm may be utilized for localizing the object as will be appreciated by one skilled in the art.

Figure 8:
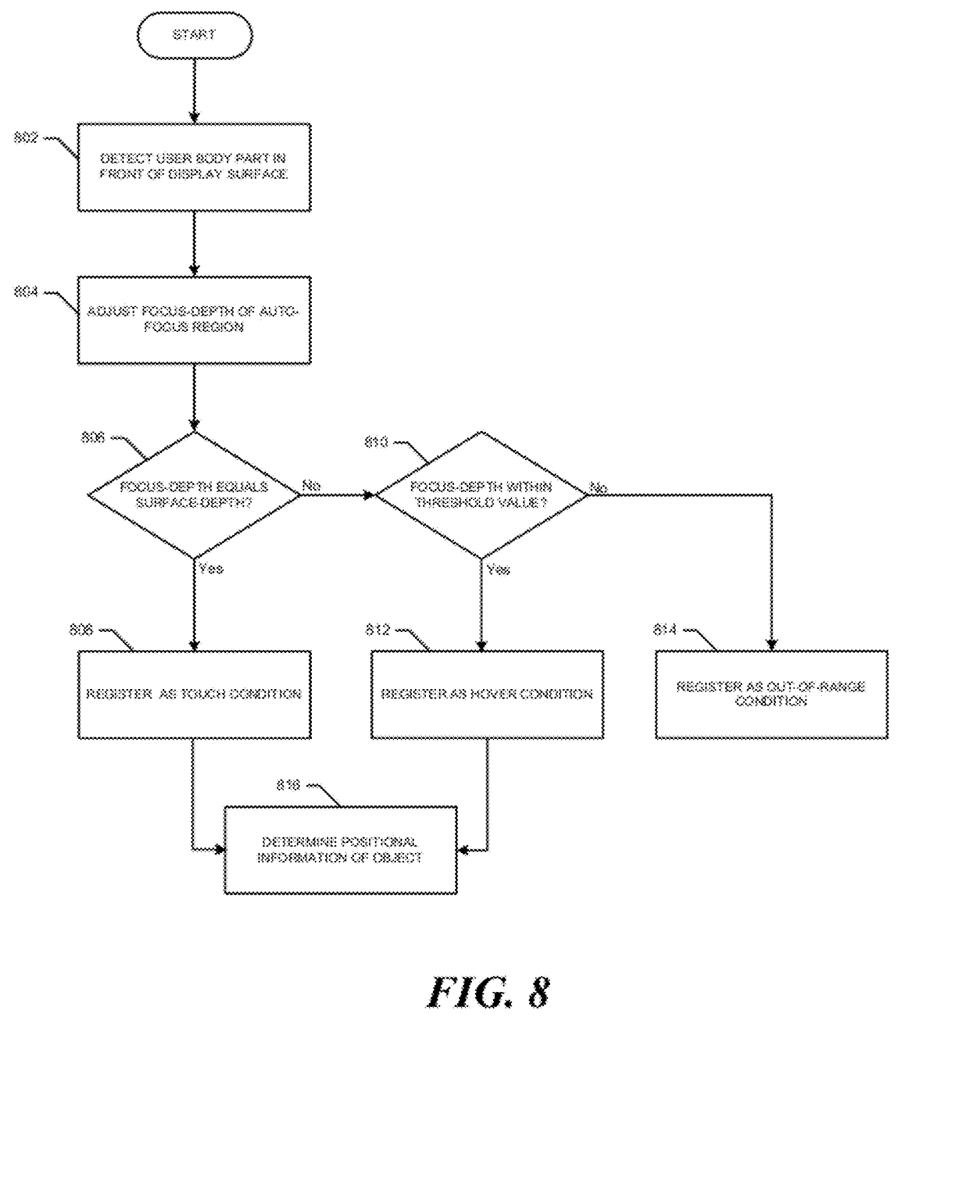
FIG. 8 is a simplified flow chart of the processing steps for focus-based touch detection using an autofocus mechanism according to an example of the present invention.

FIG. 8 is a simplified flow chart of the processing steps for focus-based touch detection using an autofocus mechanism according to an example of the present invention. In step 802, the image sensor detects the presence of an object or user's body part along the front of the display surface. Thereafter, in step 804, the processing unit automatically adjusts the focus-depth of the autofocus mechanism such that the sharpness and/or contrast of the detected object is at a maximum. If, in step 806, the processing unit determines that the focus depth of the detected object substantially corresponds to the focus-depth of a reference pattern as described above, then processing unit registers a "touch condition" within the focal sub-region associated with the detected object in step 608. On the other hand, if in step 810, the processing unit determines that the focus-depth of the detected object does not sufficiently correspond to the focus-depth of the reference pattern, but meets a predetermined threshold value (e.g., sufficiently high contrast/sharpness), then the processing unit registers a "hover condition" within the focal sub-region associated with the detected object in step 812. However, if the detected body part is out of focus, or below the predetermined threshold value (e.g., minimum sharpness and/or contrast), then the processing unit may determine that the object or body part is not sufficiently close the contact surface of the display unit and thus out-of-range. In the event a touch or hover condition is found, then in step 816 the processing unit determines positional information of the detected object as described above.

Embodiments of the present invention provide a system and method for providing focus-based touch and hover detection. Many advantages are afforded by the system and method implementing examples of the present invention. For instance, the focus-based system does not require expensive depth sensors as used in more common hover-based touchscreen systems. That is, examples of the present invention are able to provide accurate touch and hover discrimination using simple and commonplace imaging and autofocus technologies.

Furthermore, while the invention has been described with respect to exemplary embodiments, one skilled in the art will recognize that numerous modifications are possible. For example, although exemplary embodiments depict a large desktop computer as representative computing device, the invention is not limited thereto. For example, the computing device may be a netbook, a tablet personal computer, a cell phone, or any other electronic device having a camera and autofocus mechanism capable of sufficiently wide-focus and depth adjustment. Furthermore, the detected object may be a stylus or body part such as a user's face or head, palm, elbow, or any body part capable of being focused on by the imaging device.

Moreover, the imaging device may include the appropriate optics or lens for maintaining the requisite field of view and depth of focus needed for touch/hover detection (e.g., cylindrical lens for a curved surface or display screen). Still further, touch and hover discrimination may also be accomplished without the reference pattern. For example, the imaging device may be configured to simply focus on the designated contact area of the surface and simply determine that a touch event has occurred when the detected object comes into focus. Thus, although the invention has been described with respect to exemplary embodiments, it will be appreciated that the invention is intended to cover all modifications and equivalents within the scope of the following claims.

What is claimed is:

1. A system for providing focus-based touch detection in a computing system, the system comprising:
   a surface having a reference pattern formed thereon;
   an imaging device including a field of view capable of simultaneous capture of an image of the reference pattern and an object positioned within proximity of a designated contact area associated with the surface;
   a processing unit to compare a focus-depth of the reference pattern a focus-depth of the object to determine if the object is touching or hovering the contact area of the surface;
   a focus-control module configured to adjust a focus-depth associated with the detected object; and
   wherein the processing unit is coupled to the focus-control module and configured to determine a touch condition or hover condition.

2. The system of claim 1, wherein the reference pattern is embedded along a border area of the surface.

3. The system of claim 2, wherein the imaging device includes a fixed-focus lens configured to maintain constant focus on the embedded reference pattern of the surface; and
   wherein a touch condition is determined when the reference pattern and detected object are simultaneously within focus.

4. The system of claim 3, wherein the processing unit registers a hover condition when the reference pattern and the detected object have focus-depths that are different but within a threshold value of each other.

5. The system of claim 1, wherein the processing unit registers a hover event when the focus-depth of the detected object does not correspond to the focus-depth of the reference pattern but is within a threshold value from the focus-depth of the reference pattern.

6. The system of claim 1, wherein the processing unit registers a touch event when the focus-depth of the detected object corresponds to the focus-depth of the reference pattern.

7. A non-transitory computer readable storage medium for a focus-based touch detection computing system, the computer readable storage medium having stored executable instructions, that when executed by a processor, causes the processor to:
- detect, via an imaging device, the presence of a body part within proximity to a front surface of a display unit; and
- analyze image data captured from the imaging device, wherein the image data includes the body part and at least one reference pattern embedded on the front surface of the display unit;
- identify a touch event or a hover event based on comparing a focus-depth of the detected body part with a focus-depth of the reference pattern;
- wherein the executable instructions further cause the processor to:
- adjust a focus of the imaging device with a focus control module to determine the focus-depth of the detected body part.

8. The non-transitory computer readable storage medium of claim 7, wherein the executable instructions further cause the processor to:
- register a hover event when the focus-depth of the reference pattern and the focus depth of the detected body part do not match but are within a threshold value of each other.

9. The non-transitory computer readable storage medium of claim 8, wherein the executable instructions further cause the processor to
- register a touch event when the focus-depth of the reference pattern corresponds to the focus-depth of the detected body part.

10. The non-transitory computer readable storage medium of claim 7, wherein the executable instructions further cause the processor to:
- determine a body part closest to the front surface of the display unit among multiple body parts viewed by said imaging device and to register that closest body part as the detected body part.

11. The non-transitory computer readable storage medium of claim 7, wherein the imaging device has a fixed-focus on the reference pattern and the executable instructions further cause the processor to:
- identify a touch event or a hover event based on a difference between the focus-depth of the detected body part compared to the focus-depth of the reference pattern.

* * * * *

UNITED STATES PATENT AND TRADEMARK OFFICE
CERTIFICATE OF CORRECTION

PATENT NO. : 9,477,348 B2
APPLICATION NO. : 13/088152
DATED : October 25, 2016
INVENTOR(S) : Irwin E. Sobel et al.

Page 1 of 1

It is certified that error appears in the above-identified patent and that said Letters Patent is hereby corrected as shown below:

In the Claims

In Column 8, Line 43 approx., in Claim 1, delete "pattern a" and insert -- pattern with a --, therefor.

Signed and Sealed this
Twenty-eighth Day of February, 2017

Michelle K. Lee
*Director of the United States Patent and Trademark Office*